(12) United States Patent
Nehls

(10) Patent No.: US 7,766,594 B2
(45) Date of Patent: Aug. 3, 2010

(54) SLOT NUT FOR SECUREMENT OF CHANNEL

(75) Inventor: Charles Nehls, Allen Park, MI (US)

(73) Assignee: Unistrut International Corporation, Wayne, MI (US)

( * ) Notice: Subject to any disclaimer, the term of this patent is extended or adjusted under 35 U.S.C. 154(b) by 436 days.

(21) Appl. No.: 11/453,421

(22) Filed: Jun. 15, 2006

(65) Prior Publication Data
US 2008/0014014 A1    Jan. 17, 2008

(51) Int. Cl.
*F16B 37/16* (2006.01)
(52) U.S. Cl. .................. 411/435; 411/84; 403/230; 248/317
(58) Field of Classification Search .......... 248/59; 411/84, 435, 90, 101, 103, 108, 119, 85, 411/87, 92, 116, 175, 177, 58, 59; 403/353, 403/264, 255
See application file for complete search history.

(56) References Cited

U.S. PATENT DOCUMENTS

| | | | | | |
|---|---|---|---|---|---|
| 2,029,089 | A | * | 1/1936 | Weirauch | 248/223.21 |
| 2,395,650 | A | * | 2/1946 | Allen | 411/84 |
| 2,421,201 | A | * | 5/1947 | Hallock | 411/84 |
| 3,150,703 | A | * | 9/1964 | Preziosi | 411/301 |
| 4,575,295 | A | * | 3/1986 | Rebentisch | 411/85 |
| 4,901,958 | A | * | 2/1990 | Kelso | 248/59 |
| 5,833,417 | A | * | 11/1998 | Sargent et al. | 411/85 |
| 6,575,680 | B2 | * | 6/2003 | Herb et al. | 411/84 |
| 6,837,661 | B2 | * | 1/2005 | Schwarz et al. | 411/552 |
| 7,287,733 | B2 | * | 10/2007 | Bongio et al. | 248/235 |

* cited by examiner

*Primary Examiner*—Gary Estremsky

(57) ABSTRACT

A slot nut is provided for securing a threaded rod to a section of channel where the channel defines a slot and the slot nut is affixed to the threaded rod prior to receipt within the slot. A method of securing threaded rod to channel defining a slot using a slot nut is also disclosed wherein the slot nut is affixed to the threaded rod prior to the threaded rod being positioned within the channel slot.

11 Claims, 7 Drawing Sheets

SLOT NUT FOR SECUREMENT OF CHANNEL

BACKGROUND

1. Technical Field

The present invention relates generally to securement devices for use with channel, and more particularly, to a newly configured nut for use with slotted channel.

2. Background of Related Art

Channel, e.g., UNISTRUT, POWERSTRUT®™, is formed strut used for support structures and bracing members. Channel is produced in a variety of sizes and steel gages. Frequently channel is formed with holes or slots to facilitate securing sections of channel with one another and for securing channel to walls and other structures or appurtenances. Channel is generally secured using threaded rod, washers and nuts. Typically, the end of a threaded rod is inserted through a slot in the channel whereupon a washer and nut are secured to the end thereof. The washer and nut prevent the rod from being withdrawn through the slot in the channel.

Depending on the application, the threaded rod may need to be tightly secured to the channel. In such an instance, a second washer and nut can be affixed to the insertion end of the rod prior to insertion of the rod through the channel slot, or a second washer and nut may be affixed to the second end of the rod subsequent to the rod being inserted through the slot. Tightening of either nut compresses the slotted channel between the two washers, tightly securing the rod to the channel. This application is generally used to connect hanger rods to channel.

When securing a section of channel with another section of channel, or to any object, a threaded rod may again be used. The threaded rod is passed through a slot in each section of channel (or object). A washer and a nut affixed on either end of the rod prevent the threaded rod from withdrawing from the channel. Tightening of the nut, or nuts about the threaded rod secures the section of channel (or object to the threaded rod). In either channel to channel connection, or channel to hanger connection, access to the inserted end of the rod subsequent to insertion through the slot in the channel is vital. Without access to the end of the rod, the washer and the nut necessary to secure the channel cannot be securely affixed to the threaded rod.

The configuration of the channel, coupled with the possible applications using the channel, does not always allow for ready access to the end of the threaded rod after it has been inserted into a channel slot. In many applications access to the end of the threaded rod after insertion of the rod through the slot is all but impossible. Therefore, it would beneficial to have a nut capable of securing a threaded rod to a slotted channel where the nut may be secured to the threaded rod prior to insertion into the slot so as to avoid accessibility issues post insertion.

SUMMARY

Accordingly, the present disclosure relates to a slot nut capable of securing an end of a threaded rod to a slotted channel, the nut being secured to the end of the rod prior to insertion through the slot.

In one embodiment, the slot nut is substantially oval in shape and has a length and a width slightly smaller than the length and width of the channel slot into which the slot nut is inserted. The slot nut has a first surface and a second surface. The first surface is sized to be received in the width of the channel slot to prevent rotation of the slot nut in relation to the channel slot. The second surface is wider then the first surface and forms a shoulder to prevent the slot nut from being withdrawn through the slot after insertion. The slot nut further defines a threaded opening sized to receive a threaded rod.

The slot nut replaces the traditional washer and nut configuration which can only be applied to the threaded rod subsequent to insertion of the threaded rod through the slot in the channel. Using the presently disclosed slot nut, the slot nut is affixed to a threaded rod prior to insertion into the channel slot. The end of the threaded rod containing the slot nut is then received through the slot in the channel. Once the slot nut completely passes through the slot in the channel, the rod and nut are rotated until the first surface of the nut aligns with the width of the slot. The rod and nut are withdrawn until the second surface of the nut contacts the channel surface defining the slot. Thereafter, a washer and nut either affixed to the other end of the threaded rod, or affixed prior to insertion of the threaded rod through the slot, may be used to securely affix the rod to the channel.

The slot nut replaces the washer and nut which had been necessary to secure threaded rod to slotted channel. Unlike the washer and nut configuration, the slot nut may be secured on the threaded rod prior to inserting the rod into the channel slot.

BRIEF DESCRIPTION OF THE DRAWINGS

Various embodiments of the presently disclosed slot nut are described herein with reference to the drawings, wherein.

DESCRIPTION OF THE PREFERRED EMBODIMENTS

Figure 1A:
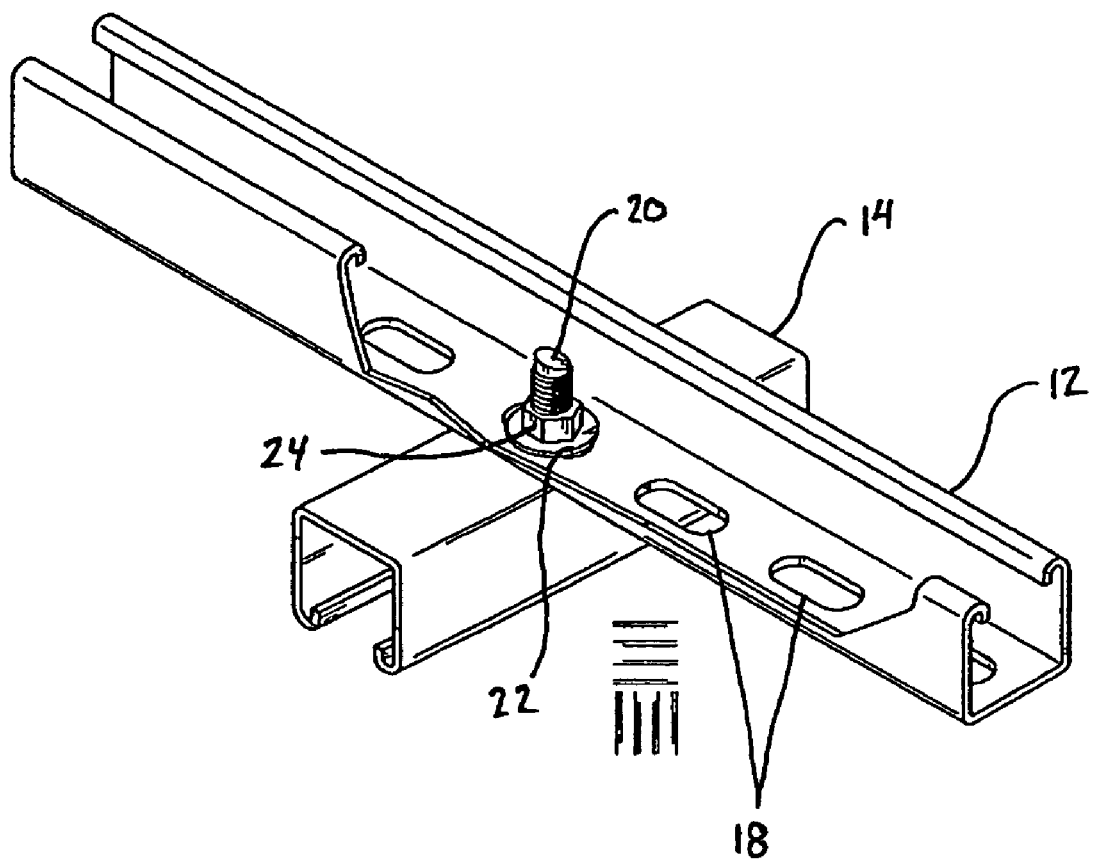
FIG. 1A is a perspective view of a prior art channel assembly including two sections of channel secured to a threaded rod with a washer and nut assembly.

Embodiments of the presently disclosed slot nut for securing channel will now be described in detail with reference to the drawings in which like reference numerals designate identical or corresponding elements in each of the several views.

Figure 1B:
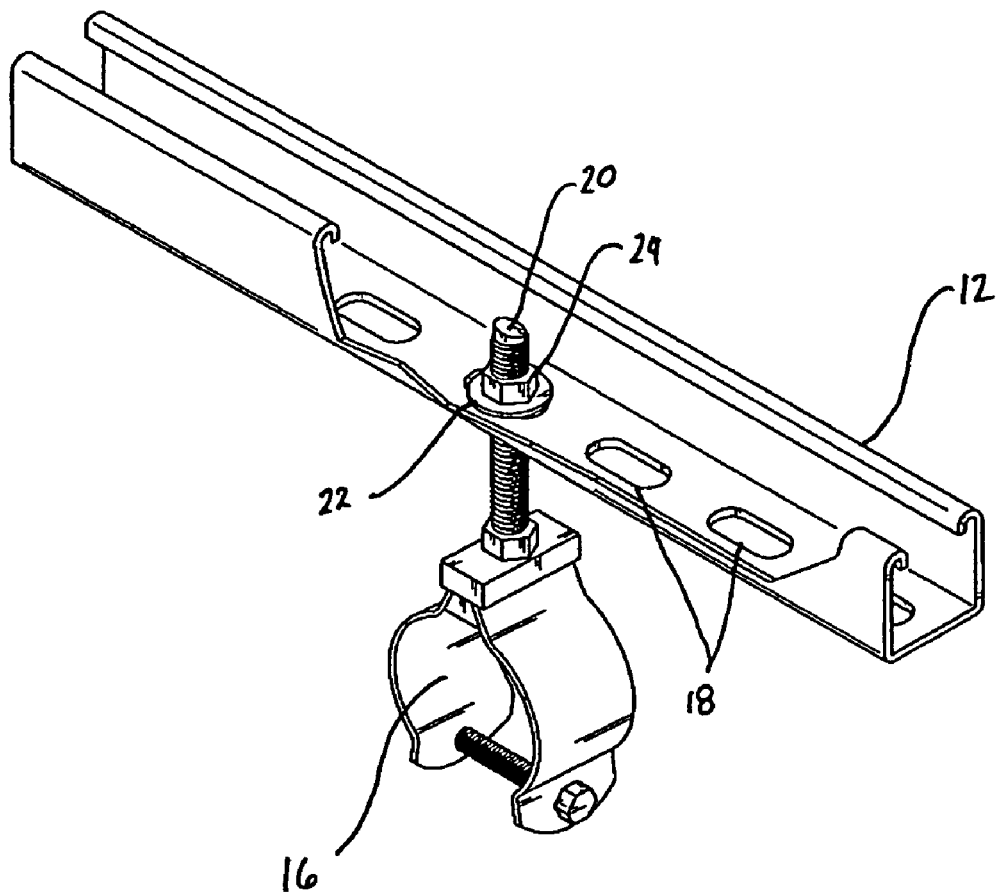
FIG. 1B is a perspective view of a prior art channel hangar assembly illustrating a section of channel secured to a hanger by a threaded rod and washer and nut assembly.
Figure 1C:
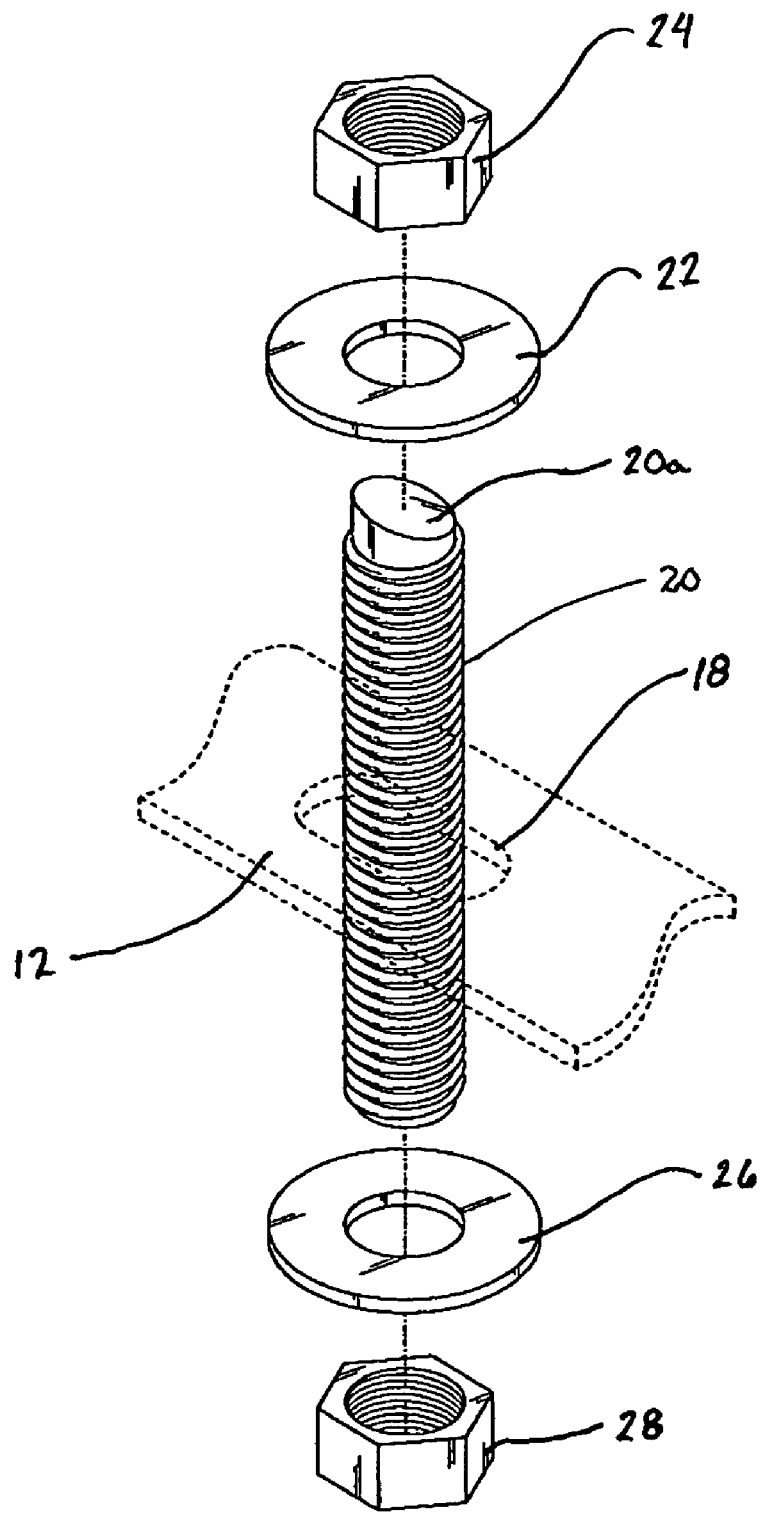
FIG. 1C is an enlarged exploded view of the threaded rod and washer and nut assembly shown in FIG. 1B.

FIGS. 1A-1C illustrate a known method for securing two pieces or sections of slotted channel 12 to a threaded rod 20. Referring to FIG. 1A, a first section of slotted channel 12 is secured to a second section of slotted channel 14 and to a threaded rod 20 by a first washer 22 and first nut 24. FIG. 1B shows the same method as illustrated in FIG. 1A, however, instead of securing slotted second channel 14 to first slotted channel 12, a hanger 26 is secured to first slotted channel 12. As seen in FIG. 1C, securing first slotted channel 12 to either second slotted channel 14 or hangar 26 using threaded rod 20 requires a first washer 22, a first nut 24 a second washer 26 and second nut 28. Threaded rod 20 is inserted through channel slot 18 and received by first washer 22 and first nut 24. Second washer 26 and second nut 28 are affixed to threaded rod 20. Second washer 26 and second nut 28 may be affixed to threaded rod 20 prior to receiving threaded rod 20 through slot 18, or subsequent to threaded rod 20 being received through slot 18. Regardless of when second washer 26 and second nut 28 are affixed to threaded rod 20, nuts 24 and/or 28 are tightened to secure threaded rod 20 to slotted channel 12, and/or slotted channel 12 to second channel 14.

The traditional securing method, as shown in FIGS. 1A-1C, requires access to the end 20a of threaded rod 20, first nut 24 and second nut 28 after the end of threaded rod 20 has been positioned through slot 18. More specifically, washer 22 and nut 24 must be positioned on threaded rod 20 after end 20a of rod 20 has been inserted through a channel slot. Access to first and second nuts 24 and 28 may not always be available, and in many instances, will be very difficult to achieve.

Figure 2A:
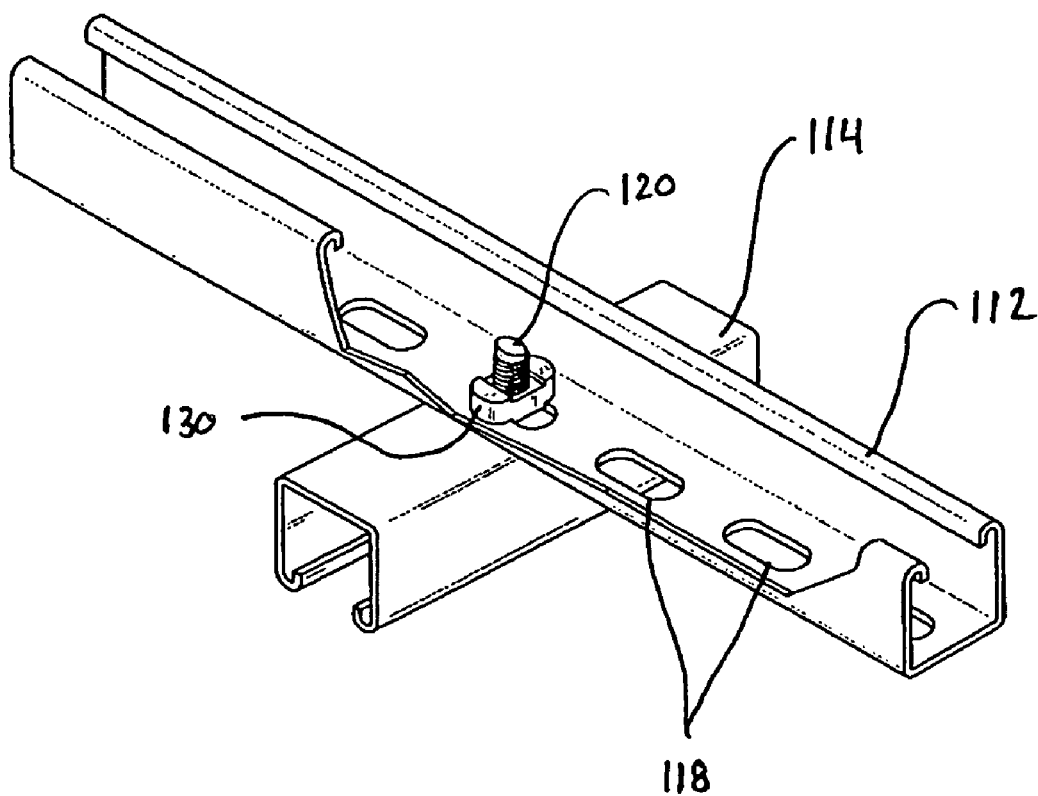
FIG. 2A is a bottom perspective view of one embodiment of the presently disclosed slot nut shown securing sections of channel to a threaded rod.
Figure 2B:
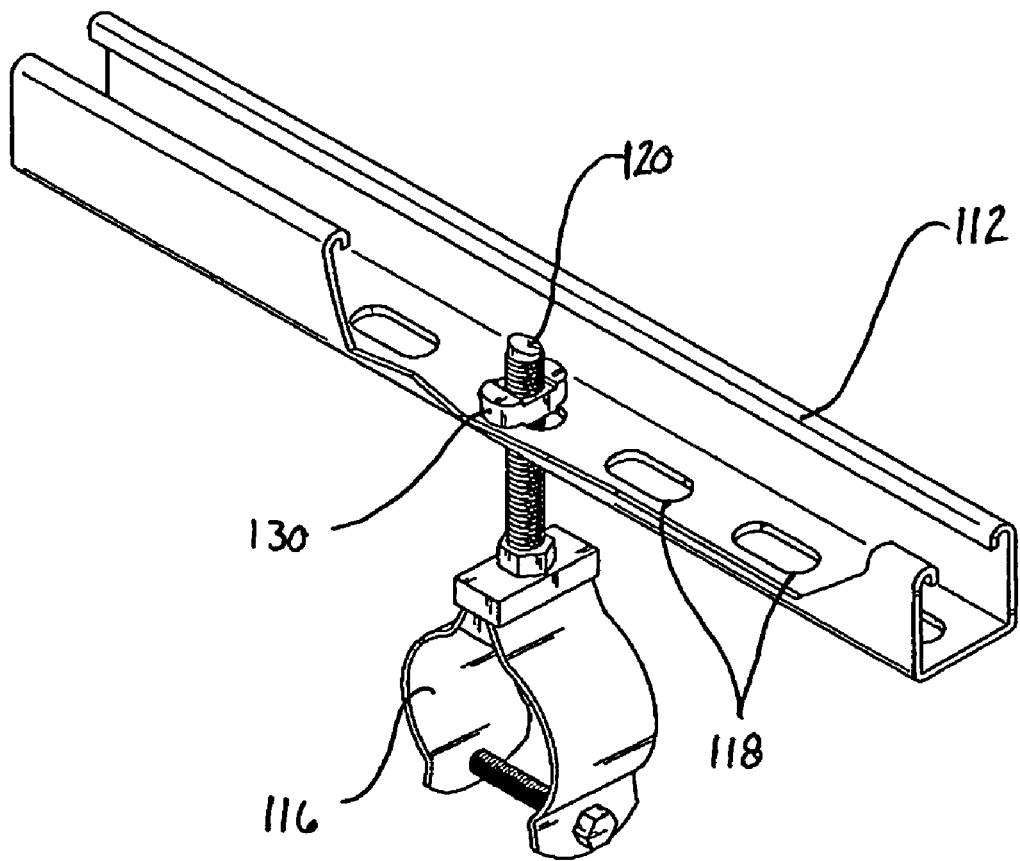
FIG. 2B is a side perspective view of the slot nut shown in FIG. 2A shown securing a piece of channel to a hangar.
Figure 2C:
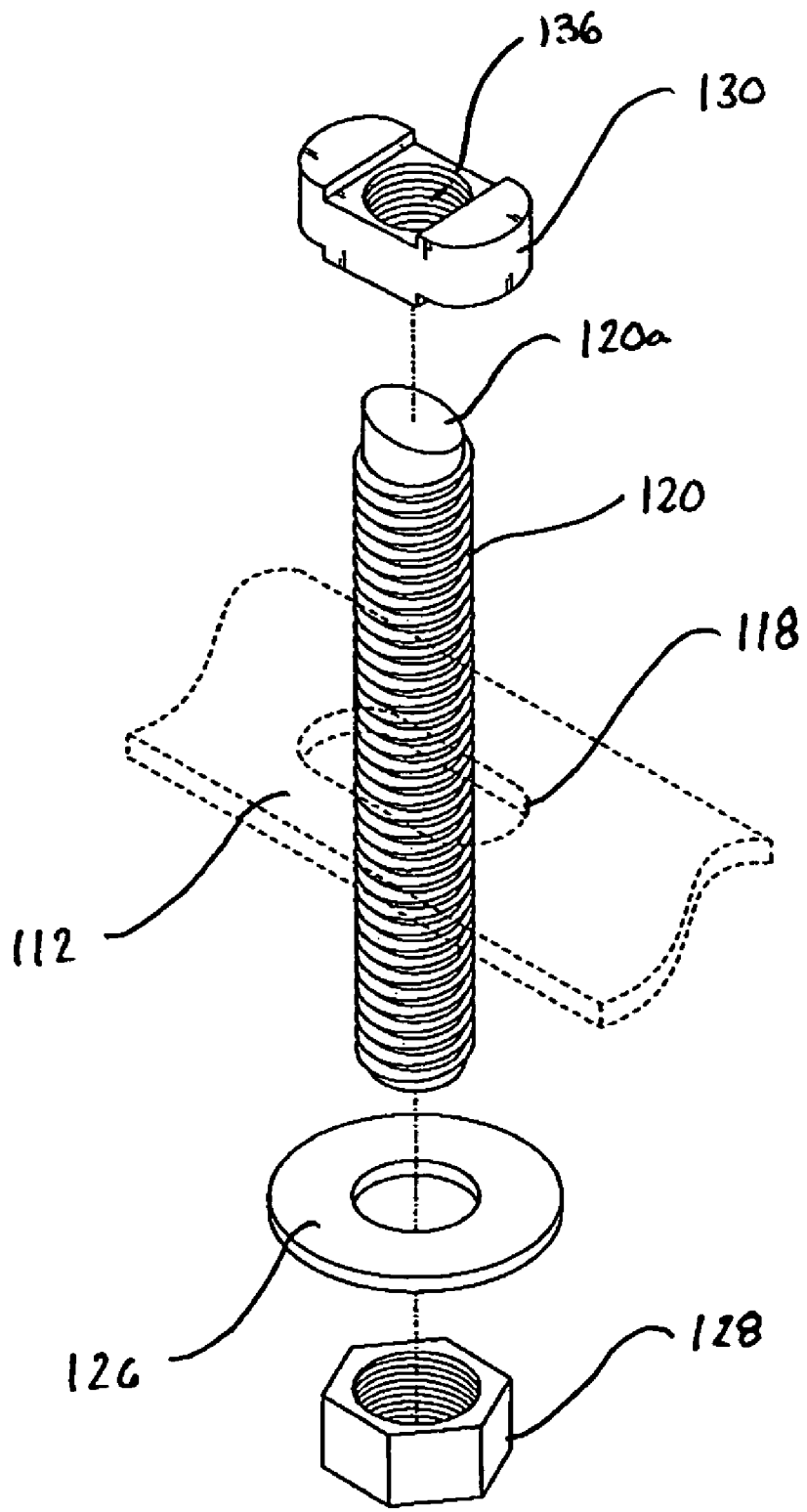
FIG. 2C is an enlarged, exploded side perspective view of the presently disclosed slot nut in association with a threaded rod, washer, and nut assembly.

FIGS. 2A-2C illustrate one preferred embodiment of the presently disclosed slot nut shown generally as 130. Referring to FIG. 2A, slotted channel 112 is secured to slotted channel 114 and with threaded rod 120 using slot nut 130. Slot nut 130 replaces first washer 122 and first nut 124 as depicted in FIG. 1A. As illustrated in FIG. 2B, hanger 116 can also be secured to slotted channel 112 with threaded rod 120 and slot nut 130. The preferred embodiment of the present disclosure is not limited to securing sections of channel to other sections of channel, or sections of channel with hangers. Any object capable of being affixed or connected in any way to threaded rod 120 can be secured using the preferred embodiment and has been contemplated by this disclosure.

Referring to FIG. 2C, slot nut 130 is affixed to threaded rod 120 prior to insertion of threaded rod 120 through slot 118 of slotted channel 112. Once slot nut 130 is affixed to threaded rod 120, both slot nut 130 and threaded rod 120 are received through slot 118. As was the case in the method illustrated in FIGS. 1A-1C, threaded rod 120 may receive second washer 126 and second nut 128 either prior to, or subsequent to, threaded rod 120 being received through slot 118.

Figure 3A:
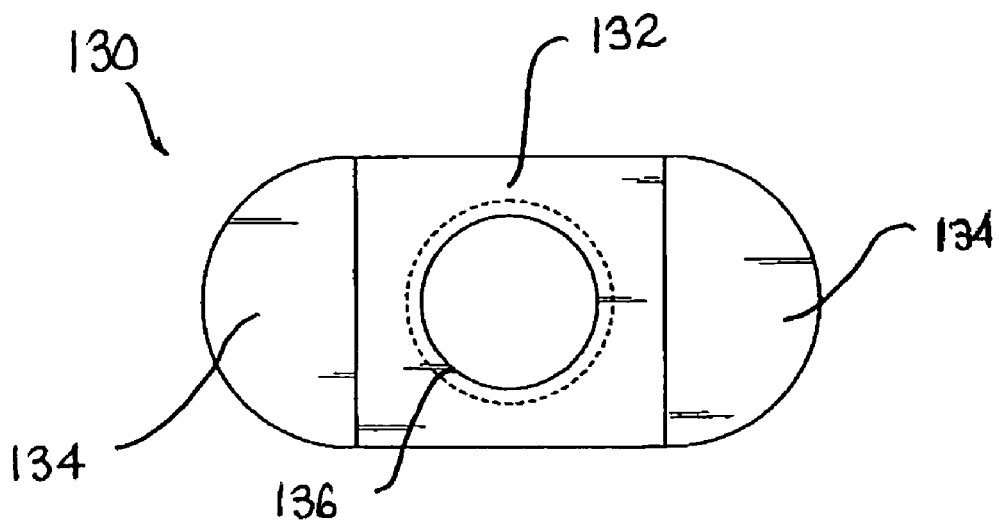
FIG. 3A is a bottom view of the slot nut shown in FIG. 2A.
Figure 3B:
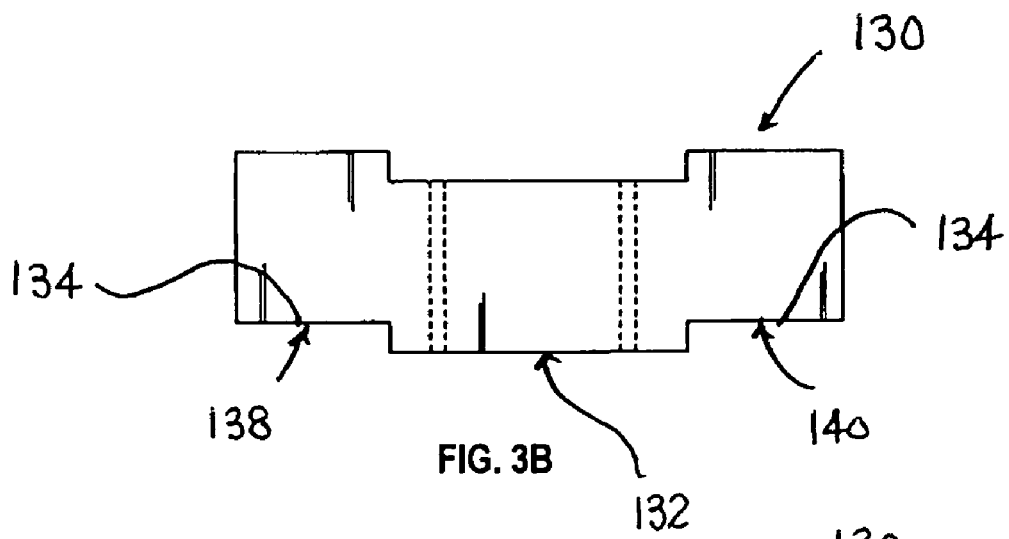
FIG. 3B is a side view of the slot nut shown in FIG. 3A.
Figure 3C:
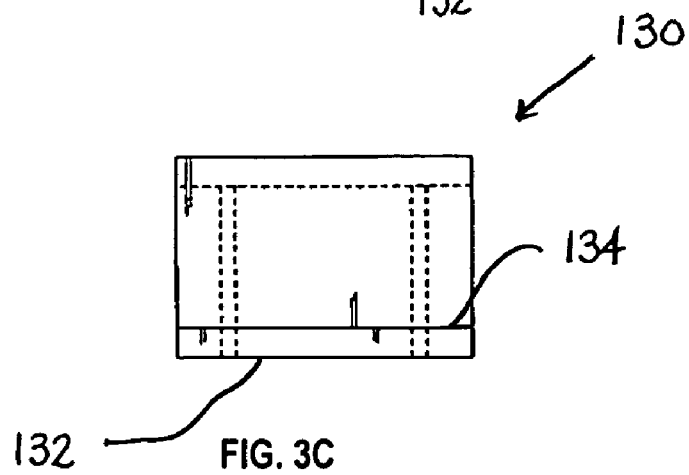
FIG. 3C is an end view of the slot nut shown in FIG. 3B.

Referring also to FIGS. 3A-3C, in one embodiment, slot nut 130 defines a substantially oval body having a first surface 132 and a second surface 134. Slot nut 130 is sized to be received through slot 118 formed in channel 112. Generally, slots in channel define an elongated oval. A standard channel slot measures 1⅛" (inches) long, 9/16" (inches) wide and has end radii of 0.281" (inches). Although channel slots are generally oval in shape, other configurations have been contemplated by this disclosure, including rectangular, trapezoidal, triangular etc. Slot nut 130 further defines a threaded opening 136 for receiving a threaded rod 120. In another embodiment of the present disclosure, the threaded rod may be an integral part of slot nut 130, i.e., the threaded rod and slot nut 130 may be manufactured as one unit. Slot nut 130 includes a second surface 134 extending beyond first surface 132. Second surface 134 defines recessed surfaces or shoulders 138 and 140. First surface 132 is dimensioned to be received within the width of channel slot 118. In use, once slot nut 130, affixed to threaded rod 120, is inserted through channel slot 118, slot nut 130 is rotated 90° (degree) to align first surface 132 with the width of channel slot 118. Thereafter, threaded rod 120 is partially withdrawn from slot 118 until first surface 132 is received within the width of the channel slot 118. Slot nut 130 is prevented from being fully withdrawn from slot 118 by second surfaces 134. By positioning surface 132 of slot nut 130 within the slot of the channels, the slot nut is rotatably fixed to channel 112. As such, threaded rod 120 can be securely affixed to channel 112 and/or a second channel 114 by tightening down on second nut 128. Since slot nut 130 is rotatably fixed within slot 118 of channel 112, rotation of second nut 128 clamps channel 112 between slot nut 130 and washer 126. Thus, access to slot nut 130 is not required.

It will be understood that various modifications may be made to the embodiments disclosed herein. Therefore, the above description should not be construed as limiting, but merely as exemplifications of preferred embodiments. Those skilled in the art will envision other modifications within the scope and spirit of the claims appended hereto.

What is claimed is:

1. A channel securement assembly comprising:
   a channel member defined by a pair of opposed side walls and a transverse wall disposed therebetween, said transverse wall having a plurality of elongated openings extending therethrough;
   a threaded rod; and
   a slot nut having a length and a width sized to pass through one of the plurality of elongated openings of the channel member when the slot nut is in a first orientation, the slot nut having a threaded bore configured to receive said threaded rod, the slot nut including:
      a first and second shoulder portions, each of said shoulder portions having a top surface; and
      a protrusion portion disposed between said first and second shoulder portions, said protrusion portion having a first surface in a non-coplanar relationship with said top surfaces of each of said first and second shoulder portions, said protrusion portion having a pair of substantially straight sides and configured to be disposed partially within one of said plurality of elongated openings—such that said pair of substantially straight sides engage said one of said plurality of elongated openings when the slot nut is in a second orientation, each of the first surfaces of the first and second shoulder portions configured to prevent passage of the slot nut through the elongated opening when the slot nut is in the second orientation wherein the first orientation of the slot nut is offset from the second orientation by about 90°.

2. The channel securement assembly of claim 1, wherein said slot nut is a first nut and said threaded bore receives a first end of said threaded rod, said channel securement assembly further comprising a second nut defining an opening configured to receive a second end of the threaded rod.

3. The channel securement assembly of claim 2, further comprising a washer defining an opening sized to receive the threaded rod.

4. The channel securement assembly of claim 2, further comprising a hanger assembly operably associated with the threaded rod.

5. The channel securement assembly of claim 2, further comprising a second channel member defining a second elongated opening configured to receive the slot nut when the slot nut is in the first orientation.

6. The channel securement assembly of claim 1, wherein the plurality of elongated openings defined by the channel member are substantially oval.

7. The channel securement assembly of claim 1, wherein the slot nut has a configuration which substantially corresponds to the configuration of the openings.

8. The channel securement assembly of claim 1, wherein the threaded opening extends through the protrusion portion.

9. The channel securement assembly of claim 1, wherein the slot nut is substantially oval.

10. A channel securement assembly comprising:
- a channel member defined by a pair of opposed side walls and a transverse wall disposed therebetween, said transverse wall having a plurality of elongated openings extending therethrough; and
- a slot nut having a length and a width sized to pass through one of the plurality of elongated openings of the channel member when the slot nut is in a first orientation, the slot nut including:
  - a first and second shoulder portions, each of said shoulder portions having a top surface; and
  - a protrusion portion disposed between said first and second shoulder portions, said protrusion portion having a first surface in a non-coplanar relationship with said top surfaces of each of said first and second shoulder portions, said protrusion portion having a pair of substantially straight sides extending from respective top surfaces of said first and second shoulder portions to said first surface of said protrusion portion and configured to be disposed partially within one of said plurality of elongated openings such that said pair of substantially straight sides engage said one of said plurality of elongated openings when the slot nut is in a second orientation, each of the first surfaces of the first and second shoulder portions configured to prevent passage of the slot nut through the elongated opening when the slot nut is in the second orientation.

11. The channel securement assembly of claim 10 wherein the first orientation of the slot nut is offset from the second orientation by about 90°.

* * * * *